United States Patent [19]

Bill, Sr. et al.

[11] Patent Number: 4,716,642

[45] Date of Patent: Jan. 5, 1988

[54] EXTRACTOR TOOL

[75] Inventors: James M. Bill, Sr.; Earl R. Schmidgall; Edward G. Schmidgall; Frank C. Schmidgall, all of Peoria, Ill.

[73] Assignee: Technological Products, Inc., Dunlap, Ill.

[21] Appl. No.: 907,815

[22] Filed: Sep. 16, 1986

[51] Int. Cl.⁴ .................................... B23P 19/04

[52] U.S. Cl. .................................... 29/265

[58] Field of Search .................... 29/265, 263, 255

[56] References Cited

U.S. PATENT DOCUMENTS

| | | | |
|---|---|---|---|
| 1,483,818 | 2/1924 | Lloyd . | |
| 1,720,428 | 7/1929 | Naggy et al. . | |
| 2,310,639 | 2/1943 | Johnson, Jr. . | |
| 2,592,420 | 4/1952 | Harrison | 29/265 |
| 2,882,591 | 4/1959 | Grossman . | |
| 2,883,740 | 4/1959 | Derby . | |
| 2,943,385 | 7/1960 | Miller . | |
| 3,055,093 | 9/1962 | Ruble | 29/265 |
| 3,120,701 | 2/1964 | Wilson . | |
| 3,241,223 | 3/1966 | Anderson | 29/265 X |
| 3,340,593 | 9/1967 | Savastano . | |
| 3,479,722 | 11/1969 | Maness . | |
| 3,529,497 | 9/1970 | Brooks . | |
| 4,104,775 | 8/1978 | Lawless | 29/265 |

FOREIGN PATENT DOCUMENTS

| | | | |
|---|---|---|---|
| 249154 | 10/1962 | Australia | 29/263 |
| 1830 | of 1914 | United Kingdom | 29/263 |

*Primary Examiner*—Robert C. Watson
*Attorney, Agent, or Firm*—Ralph E. Walters

[57] ABSTRACT

The present invention is directed to an extractor tool for removing valve lifters from an engine block or head in a fast convenient manner and with a minimum of manual dexterity or strength. The prior art devices provide tools having complicated force multiplying linkages and camming devices associated with a plurality of groove engaging fingers which are only adapted to engage a single groove or oil hole in the valve lifter body. The present invention overcomes these deficiencies by providing an extractor tool which is adapted to engage multiple grooves within the valve lifter body and assures precise alignment therebetween to eliminate any cocking of the lifter body relative to the extractor tool during removal of the lifter from the enginer block.

6 Claims, 3 Drawing Figures

EXTRACTOR TOOL

TECHNICAL FIELD

The present invention generally relates to an extractor tool for removing cylindrical sleeves, bushings and the like from blind bottomed bores and more particularly to such an extractor tool specifically adapted for removing hydraulic valve lifter bodies from internal combustion engine blocks and heads.

BACKGROUND ART

The normal function and necessity for removing hydraulic valve lifters which have become frozen or stuck within their associated bores in the block and head of an internal combustion engine is well known in the art. This is exemplified by U.S. Pat. No. 2,882,591 to Grossman; U.S. Pat. No. 2,883,740 to Derby; U.S. Pat. No. 2,943,385 to Miller; U.S. Pat. No. 3,120,701 to Wilson; and U.S. Pat. No. 3,479,722 to Maness. These patents fully describe the normal operation of hydraulic valve lifters in an internal combustion engine and the problems which frequently occur that require their removal and replacement. The patents are further directed to various types of tools for mechanically breaking loose and extracting the lifters from the engine block. Most of these provide a tool having a head portion on which is mounted a plurality of expandable/retractable gripping members or fingers. The fingers are typically manipulated by a complicated force multiplying camming mechanism or he like on the head which is manually operated by suitable control linkage extending outwardly toward an opposite handle end of the tool.

The head end of the tool is adapted to be inserted into the lifter body which has several oil holes and one or more internal annular grooves therein for receiving snap ring retainers or the like normally employed to hold the lifter body and push rod components in operating assembly.

After removal of the push rod and snap rings the grooves are intended to be utilized for receiving the fingers of the extractor tool and the control linkage maniipulated externally thereof by the handle in an attempt to expand the fingers in tightly gripping relation to the lifter body, assuming the fingers and grooves have been properly aligned. Other tools of the prior art attempt to utilize one of the oil holes in the lifter for engagement by small pins on the finger of the tool. Because of the alignment problem the prior art tools are only intended to operate with the uppermost lifter groove or oil hole. Even then such alignment can only be accomplished blindly and primarily by "feel" requiring that the head of the tool be reciprocated within the lifter in a "hunting" exercise when attempting to locate the lifter groove or oil hole while concurrently expanding the fingers against the inner wall of the lifter body for placement into the groove or oil hole when alignment is finally achieved. This is usually an onerous, frustrating and time consuming procedure with no assurance that a dependable connection will be made between the tool and lifter body even after repeated attempts. Such connection of the tool can only be tested by further manipulations in an attempt to extract the lifter and because of the engagement of the fingers with only a single oil hole or snap ring groove this frequently results in slippage and their complete separation from the lifter. Severe damage to the lifter grooves or oil hole may also result making reinstallation of the tool and further attempts at extraction of the lifter nearly impossible. These prior art extractors employ very complex structures which are difficult and expensive to manufacture and to use with any degree of dependability or success. Consequently, it is recognized that an improved extractor tool for the quick, dependable removal of hydraulic value lifters could be provided having a greatly simplified structure which is easily and conveniently installed with the gripping members thereof being automatically and precisely alignable with more than a single groove in the lifter for establishing a dependable connection capable of withstanding the forces required to effect withdrawal of the lifter from an engine block or head. Accordingly, the present invention is intended to overcome the problems as set forth above.

DISCLOSURE OF THE INVENTION

In accordance with one aspect of the present invention, there is provided an extractor tool for removing hydraulic valve lifters from an engine block or head which utilizes an elongated puller having a head end insertable within the valve lifter and providing expandable/retractable lifter gripping means thereon and an actuator member slideably mounted on the puller for movement to a position disposed between the puller and the gripping means for expanding the gripping means on the head end into tightly gripping rigidly connecting relation with the lifter.

BEST MODE FOR CARRYING OUT THE INVENTION

Figure 1:
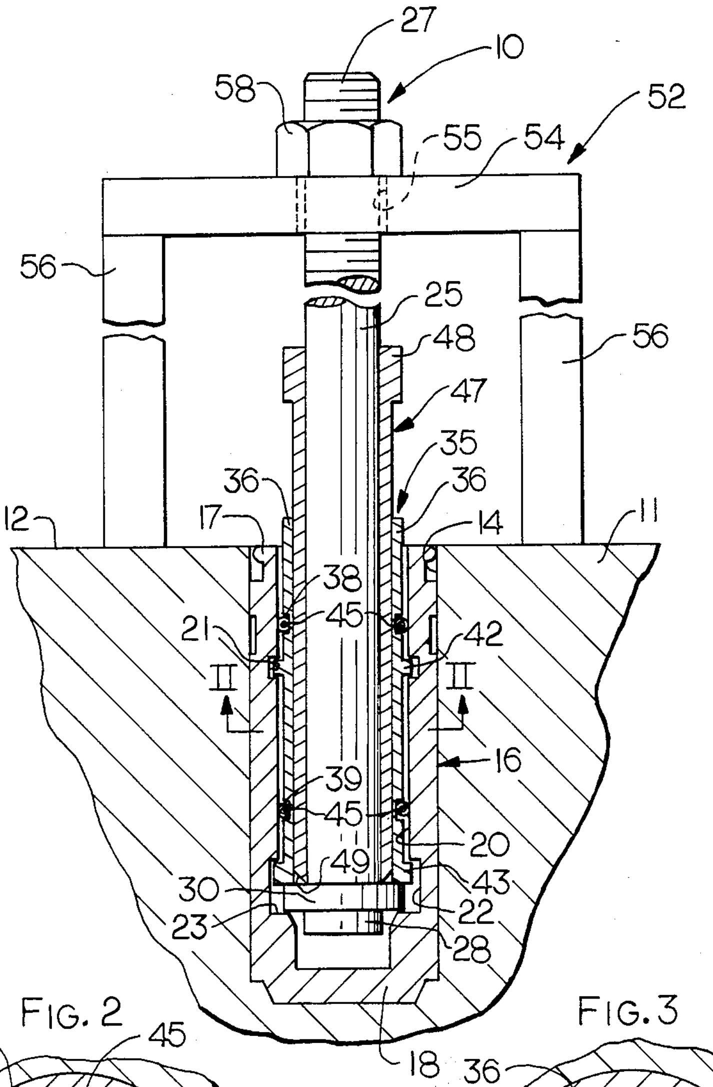
FIG. 1 is a vertical cross section through an engine block or head and hydraulic valve lifter assembly showing the extractor tool of the present invention disposed in a radially expanded gripping position within the valve lifter.
Figure 2:
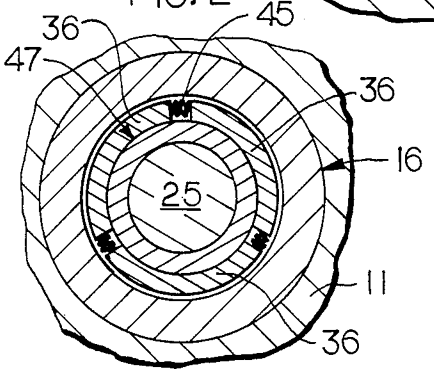
FIG. 2 is a horizontal cross section through the extractor tool and valve lifter taken along the line II—II of FIG. 1.

Referring more particularly to FIG. 1 of the drawing an extractor tool embodying the principles of the present invention is generally indicated by the reference numeral 10. The tool is adapted to be utilized with an engine block or head 11 only fragmentarily represented on the drawing and having an upper surface 12 with a valve lifter bore 14 disposed therein. A valve lifter body 16 is disposed within the bore and is shown with its associated push rod removed. The valve lifter body provides opposite upper and lower ends 17 and 18, respectively, and has a cylindrical stepped bore 20 therein. The lifter includes an upper snap ring groove 21 which normally receives a snap ring or other appropriate retainer, not shown, for holding the push rod and valve lifter in assembly. An enlarged annular lower clearance groove 22 is provided near the lower end 18 of the lifter which provides a lower shoulder 23 adjacent to the lower closed end thereof.

The extractor tool 10 further includes an elongated puller rod 25 having an outer screw-threaded end 27 and an enlarged inner head end 28. A further enlarged annular flange 30 is disposed at the inner head end of the puller rod for a purpose hereinafter to be described.

A lifter gripping mechanism generally indicated by the refernce numeral 35 is mounted on the inner head end 28 of the puller rod 25. A plurality of elongated arcuate segments 36 are mounted on the head end of the rod in abutment with the annular flange 30 and in circumscribing relation to the puller rod 25. Each of the segments has an upper groove 38 in a continuous path circumscribing the puller rod. Each of the segments further include a downwardly spaced lower groove 39 continuously around the segments. An upper entegral ring 42 is disposed in circumscribing relation to the puller rod 25 in spaced axial relation to a lower annular ring 43 adapted to abut the lower shoulder 23 of the valve lifter 16. A pair of endless circular garter springs 45 are individually disposed within the upper and lower grooves 38 and 39 in the segments 36 to hold them in the desired contacted relation or position shown in FIG. 3.

An elongated tubular actuator sleeve 47 is axially slideably disposed on the puller rod 25 and initially located above the valve lifter 16. The sleeve has an upper grasping end 48 and a lower frusto-conical chamfered end 49 which serves as a wedge for insertion between the segments and the puller rod.

The extractor tool 10 of the present invention is further utilized in connection with any appropriate puller frame for applying an outward longitudinally directed force against the puller rod 25. For example, a puller frame 52 as shown in FIG. 1 may be utilized having a substantially horizontal cross bar 54 provided with a centrally located threaded bore 55. A pair of support legs 56 are rigidly connected to the ends of the cross bar and a nut 58 is screw-threadably mounted on the outer screw-threaded end 27 of the puller rod after extension through the bore 55 in the puller frame.

Industrial Applicability

Figure 3:
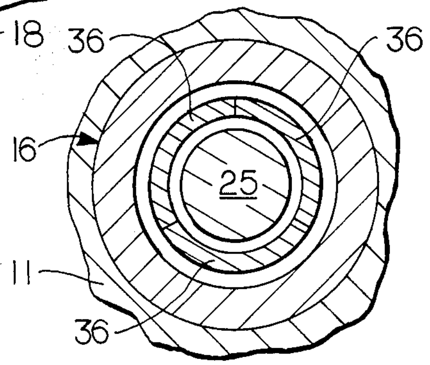
FIG. 3 is a horizontal cross section taken along the same line as FIG. 2 but showing the extractor tool of the present invention in a radially retracted position within the lifter.

When it becomes necessary to effect the removal of the valve lifter 16 from the bore 14 in the engine block or head 11, the head end 28 of the puller rod 25 is inserted into the stepped bore 20 of the lifter. At such time the garter springs 45 are sufficiently strong to assure that the segments 36 are in the edgewardly abutting retracted positions in intimately engaging relation to the puller rod 25 as shown in FIG. 3. In such retracted position, the segments are easily slid downwardly through the bore in the valve lifter until the annular flange 30 of the rod engages the lower shoulder 23 in the bore.

During such initial insertion operation the actuator sleeve 47 is disposed upon the puller rod 25 in upwardly spaced relation from the upper end 17 of the valve lifter 16 and above the upper surface 12 of the engine block or head 11. The upper end 48 of the actuator sleeve is then grasped by the operator and shoved downwardly with sufficient force to cause the lower chamfered end 49 thereof to wedge the segments 36 radially outwardly in separating relation to each other. Such movement is only nominally resisted by the garter springs 45 as such downward movement of the actuator sleeves continues until the lowered chamfered end engages the annular flange 30 of the puller rod.

It will be noted that during the initial insertion of the extractor tool 10 into the bore 20 of the valve lifter 16 the axial width of the annular flange 30 combined with the width of the lower ring 43 of the segments will precisely align the lower ring with the lower clearance groove 22 in the lifter. At the same time the upper ring 42 of the segments is disposed in precise radial alignment with the upper snap ring groove 21 of the lifter. Accordingly, during installation of the actuator sleeve 47, both rings are radially expanded into their respective grooves within the lifter with only a nominal longitudinal force exerted against the upper grasping end 48 of the actuator sleeve. The dual connection provided by the simultaneously actuated rings 42 and 43 into their respective grooves in the lifter, provides a dependable rigid connection therebetween which completely eliminates any possibility of separation during the subsequent pulling or removal procedure.

The puller frame 52 is then mounted on the upper surface 12 of the engine block or head 11 by extending the upper screw-threaded end 27 of the puller rod through the bore 55 in th cross bar 54. The nut 58 is then screw-threadably disposed upon the upper end of the puller rod and tightened downwardly against the upper surface of the cross bar. Further downward rotation of the nut 58 will effectively apply an upward longitudinal or axial force through the enlarged annular flange 30 on the rod against the lower ring 43 on the segments and thence to the valve lifter body 16. The dual connection points provided by the rings 42 and 43 in their respective grooves within the lifter body enables the body to be slid upwardy, outwardly of the bore 14 in the block or head without any misalignment tipping or further wedging of the lifter body within the bore. After complete removal of the valve lifter 16 from the engine block or head 11, the extracted valve lifter can be easily disengaged from the extractor tool 10 by merely sliding the actuator sleeve 47 axially, outwardly from between the segments 36 and the puller rod 25 with the garter springs 45 being effective to return the segments automatically to their retracted positions shown in FIG. 3.

In view of the foregoing, it is readily apparent that the structure of the present invention provides an improved extractor tool affording dual inseparable connector points between the tool and the lifter body which eliminates any cocking of the tool relative to the lifter during the extraction operation. Such dual connector points are concurrently automatically aligned with their respective receiving grooves in the lifter body which eliminate any necessity for blindly hunting such precisely aligned positioning of the connector members. The extractor tool of the present invention is further easily, manually manipulated with a minimum of manual force both during the installing, extraction and subsequent removal of the extracted lifter body from the tool 10.

We claim:

1. An extractor tool, for removing a hydraulic valve lifter body from an engine block or head with the lifter body having a bore provided with at least a pair of relatively widely axially spaced internal annular grooves, comprising:

an elongated puller rod having a head end insertable into said bore of such a lifter body;

a plurality of expandable arcuate segments loosely disposed in edgewardly abutting circumscribing relation on said head end of the pullar rod when in a collapsed retracted position and having a pair of relatively widely axially spaced external grooves circumscribing the segments;

a pair of garter springs individually mounted in said external grooves expandably holding said segments in said retracted position during insertion into said bore of the lifter body;

actuator means slideably mounted on said puller rod for movement into a position disposed between said rod and said expandable segments;

and a pair of relatively widely axially spaced body gripping rings radially outwardly extended from the segments in substantially continuous circumscribing relation thereabout with the rings being individually alignable with and expandable into said annular grooves in said lifter body.

2. The extractor tool of claim 1 in which said actuator means is an elongated tubular sleeve slideably mounted on said puller rod normally adjacent to said segments, and having a frustoconical chamfered end initially wedgeable between said rod and said segments upon axial sliding movement along the rod the full length of the segments to radially expand said segment rings to a maximum expanded position extending into said annular grooves in the lifter body.

3. The extractor tool of claim 2 wherein said head end of the puller rod is enlarged to provide an annular flange with a shoulder engageable by said chamfered end of the sleeve and said segments including ends also engaging said shoulder radially outwardly from said chamfered end of the sleeve.

4. The extractor tool of claim 3 in which said puller rod has an opposite outer end, and power means supported on said engine block or head engageable with said outer end of the puller rod to generate an exclusively axial pulling force through the flanged head end of the puller rod and annular rings on the segments engaging the lifter body in their respective grooves for removal of the lifter body from the block or head.

5. The extractor tool of claim 4 wherein said segments provide opposite upper and lower ends with a first of said body gripping rings being disposed at said lower rod for engagement with said shoulder of the head end of the puller rod, and a second of said body gripping rings being disposed in relatively widely axially spaced relation to said first ring and in inwardly spaced adjacent relation to said upper end of the segments for simultaneous radial extension individually into said multiple grooves in the lifter body.

6. The extractor tool of claim 5 in which said lifter body has a closed lower end providing a shoulder against which said annular flange of the puller rod is adapted to engage to precisely align said segment rings wih their respectively associated grooves in the lifter body.

* * * * *